(12) United States Patent
Nowakowski et al.

(10) Patent No.: US 12,505,612 B2
(45) Date of Patent: Dec. 23, 2025

(54) SYSTEMS AND METHODS FOR DYNAMIC THREE-DIMENSIONAL MODEL LIGHTING AND REALISTIC SHADOW RENDERING IN AUTOMOTIVE MIXED REALITY APPLICATIONS

(71) Applicant: Valeo Comfort and Driving Assistance, Creteil (FR)

(72) Inventors: Christopher Nowakowski, San Mateo, CA (US); Anthony Amos, San Mateo, CA (US); Anushalakshmi Manila, San Mateo, CA (US); Jaime Almeida, San Mateo, CA (US); Nicodemus Estee, San Mateo, CA (US); Sonam Negi, San Mateo, CA (US)

(73) Assignee: Valeo Comfort and Driving Assistance (FR)

( * ) Notice: Subject to any disclaimer, the term of this patent is extended or adjusted under 35 U.S.C. 154(b) by 194 days.

(21) Appl. No.: 18/243,449

(22) Filed: Sep. 7, 2023

(65) Prior Publication Data

US 2025/0086884 A1    Mar. 13, 2025

(51) Int. Cl.
G06T 15/50    (2011.01)
G06T 15/80    (2011.01)
G06T 19/00    (2011.01)

(52) U.S. Cl.
CPC ............ G06T 15/506 (2013.01); G06T 15/80 (2013.01); G06T 19/006 (2013.01)

(58) Field of Classification Search
None
See application file for complete search history.

(56) References Cited

U.S. PATENT DOCUMENTS 8,576,285 B2 * 11/2013 Gomi .................. B60R 1/27
                                                348/148
9,633,266 B2 * 4/2017 Shimizu ................. G06T 15/00
9,881,414 B2 * 1/2018 Lee .......................... G06T 15/60
(Continued)

FOREIGN PATENT DOCUMENTS

DE    102018100599 A1    7/2019
EP        2741260 A1    6/2014
WO    2022104295 A1   12/2021

OTHER PUBLICATIONS

Jonas Trottnow et al. "Intuitive Virtual Production Tools for Set and Light Editing." CVMP 2015, Nov. 24-25, 2015, London, United Kingdom, 8 pages.
(Continued)

*Primary Examiner* — Ryan M Gray
(74) *Attorney, Agent, or Firm* — Dickinson Wright PLLC

(57) ABSTRACT

A method for generating a virtual rendering includes receiving first image data that includes a plurality of images. Each image of the plurality of images may correspond to an environment of a non-virtual object. The method also includes determining a current position of a light source relative to the non-virtual object, determining a current intensity value of the light source, and generating a virtual rendering of the non-virtual object using the plurality of images, the current position of the light source relative to the non-virtual object, and the current intensity value of the light source. The method also includes providing, at a display, the virtual rendering.

20 Claims, 4 Drawing Sheets

(56) References Cited

U.S. PATENT DOCUMENTS

| | | |
|---|---|---|
| 10,354,449 B2 | 7/2019 | Todeschini |
| 10,657,721 B2 | 5/2020 | Yin et al. |
| 10,735,667 B1* | 8/2020 | Kida .................. H04N 23/74 |
| 11,631,151 B2 | 4/2023 | Cella |
| 2013/0293582 A1* | 11/2013 | Ng-Thow-Hing .... G06T 19/006 |
| | | 345/633 |
| 2014/0160100 A1* | 6/2014 | Edgren ................ G06T 15/506 |
| | | 345/207 |
| 2016/0364914 A1 | 12/2016 | Todeschini |
| 2019/0315275 A1* | 10/2019 | Kim ........................ B60J 1/02 |
| 2024/0171724 A1* | 5/2024 | Irshad .................... G06N 3/045 |
| 2024/0355060 A1* | 10/2024 | Jeppe .................. H04W 64/003 |
| 2024/0362793 A1* | 10/2024 | Raj ........................ G06T 15/06 |
| 2025/0115265 A1* | 4/2025 | Ishiyama ............. G06V 20/588 |

OTHER PUBLICATIONS

Jinsong Zhang et al. "All-Weather Deep Outdoor Lighting Estimation." 2019 IEE/CVR Conference on computer Vision and Pattern Recognition (CVPR), pp. 10150-10158.

Written Opinion and International Search Report for PCT/US2024/045340, Dated Nov. 12, 2024, All together 12 Pages.

Website https://www.fujitsu.com/us/Images/360_OmniView_AppNote.pdf Author Unknown, FUJltSU, "360° Wrap-Around Video Imaging Technology Ready for Integration with Fujitsu Graphics SoCs." Dated Jan. 2014, 7 Pages.

* cited by examiner

SYSTEMS AND METHODS FOR DYNAMIC THREE-DIMENSIONAL MODEL LIGHTING AND REALISTIC SHADOW RENDERING IN AUTOMOTIVE MIXED REALITY APPLICATIONS

TECHNICAL FIELD

The present disclosure relates to automotive three-dimensional mode rendering, and in particular to systems and methods for dynamic three-dimensional model lighting and realistic shadow rendering in automotive mixed reality applications.

BACKGROUND

Vehicles, such as cars, trucks, sport utility vehicles, crossover vehicles, mini-vans, all-terrain vehicles, recreational vehicles, watercraft vehicles, aircraft vehicles, or other suitable vehicles are increasingly utilizing image capturing devices, such as image sensors, cameras, light-detection and ranging sensors, radio-detection and ranging sensors, and the like. Such image capturing devices may be disposed on the exterior and/or in the interior of a vehicle and may capture image data of an environment of the vehicle (e.g., including an internal environment, such as a vehicle interior, and an external environment being traversed or surrounding the vehicle).

Increasingly, such image data is being used to render mixed reality video or images for use in, for example, vehicle operation. For example, a vehicle operator may shift a transmission of a vehicle to a reverse gear in order to operate the vehicle in a reverse mode. While the vehicle is being operated in the reverse mode, a rendering of the vehicle may be depicted in an environment of the vehicle on a display of the vehicle. The operator may use the rendering to assist in operating the vehicle in the reverse mode.

SUMMARY

An aspect of the disclosed embodiments includes a method for generating a virtual rendering. The method includes receiving first image data that includes a plurality of images. Each image of the plurality of images may correspond to an environment of a non-virtual object. The method also includes determining a current position of a light source relative to the non-virtual object, determining a current intensity value of the light source, and generating a virtual rendering of the non-virtual object using the plurality of images, the current position of the light source relative to the non-virtual object, and the current intensity value of the light source. The method also includes providing, at a display, the virtual rendering.

Another aspect of the disclosed embodiments includes a system for generating a virtual rendering. The system includes a processor and a memory. The memory includes instructions that, when executed by the processor, cause the processor to: receive first image data that includes a plurality of images, where each image of the plurality of images corresponds to an environment of a non-virtual object; determine a current position of a light source relative to the non-virtual object; determine a current intensity value of the light source; generate a virtual rendering of the non-virtual object using the plurality of images, the current position of the light source relative to the non-virtual object, and the current intensity value of the light source; and provide, at a display, the virtual rendering.

Another aspect of the disclosed embodiments includes an apparatus generating a virtual rendering of a vehicle. The apparatus includes a vehicle controller configured to: receive first image data that includes a plurality of images, where each image of the plurality of images corresponds to an environment of a vehicle; determine a current position of at least one light source relative to the vehicle; determine a current intensity value of the at least one light source; generate a virtual rendering of the vehicle using the plurality of images, position a virtual light source in the virtual rendering based on the current position of the at least one light source relative to the vehicle; adjust an intensity value of the virtual light source based on the current intensity value of the at least one light source; and provide, at a display of the vehicle, the virtual rendering.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
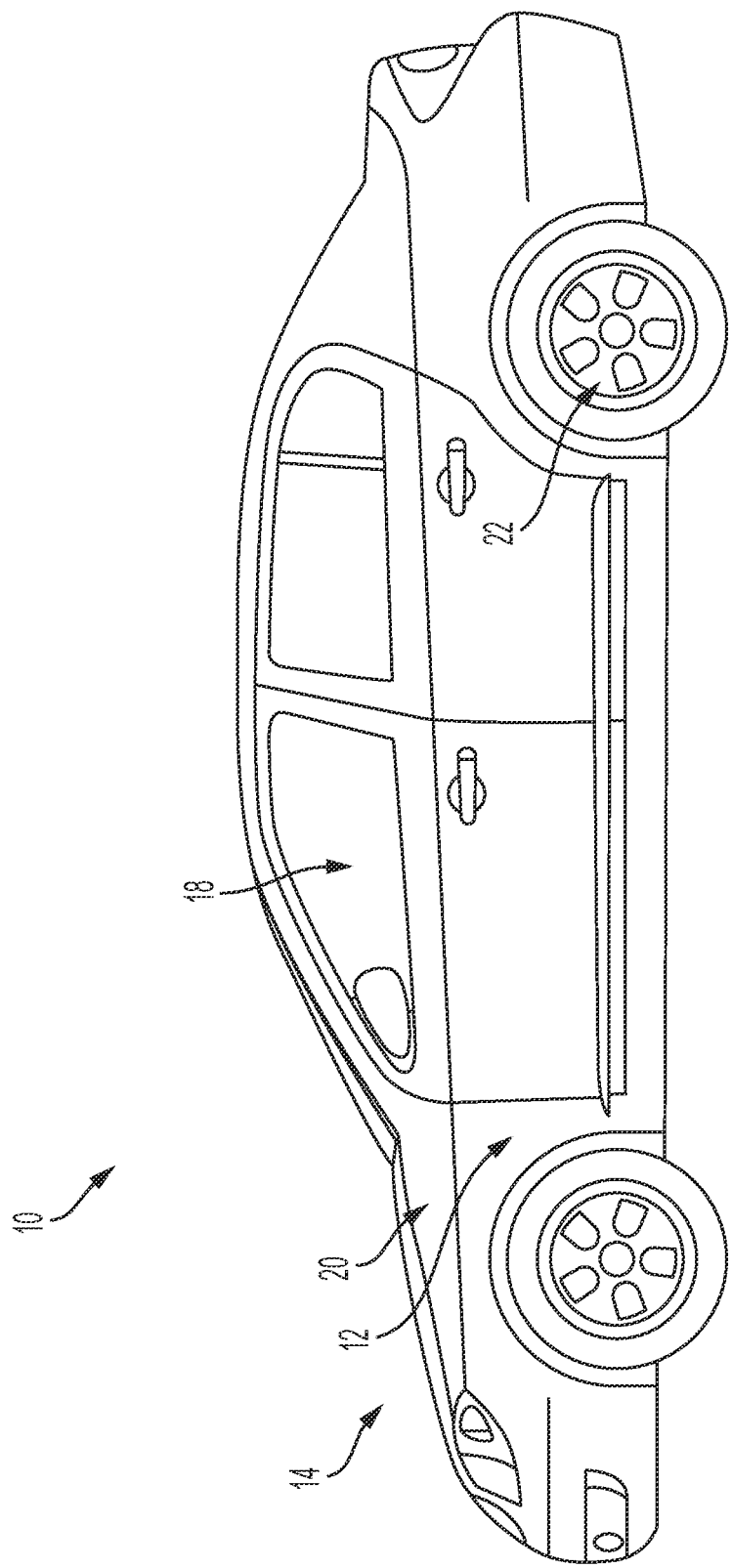
FIG. 1 generally illustrates a vehicle according to the principles of the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As described, vehicles, such as cars, trucks, sport utility vehicles, crossover vehicles, mini-vans, all-terrain vehicles, recreational vehicles, watercraft vehicles, aircraft vehicles, or other suitable vehicles are increasingly utilizing image capturing devices, such as image sensors, cameras, light-detection and ranging sensors, radio-detection and ranging sensors, 360-degree image capturing devices, and/or the like. Such image capturing devices may be disposed on the exterior and/or in the interior of a vehicle and may capture image data of an environment of the vehicle (e.g., including an internal environment, such as a vehicle interior, and an external environment being traversed or surrounding the vehicle).

Increasingly, such image data is being used to render mixed reality video or images for use in, for example, vehicle operation. For example, a vehicle operator may shift a transmission of a vehicle to a reverse gear in order to operate the vehicle in a reverse mode. While the vehicle is being operated in the reverse mode, a rendering of the vehicle may be depicted in an environment of the vehicle on a display of the vehicle. The operator may use the rendering to assist in operating the vehicle in the reverse mode.

Such mixed reality video renderings may combine virtual three-dimensional (3D) digital models and live streaming video data and/or or pre-recorded video data (e.g., collectively referred to herein as video data) captured by one or more image capturing devices (e.g., cameras and the like) associated with, for example, a vehicle in a real world (e.g., non-virtual) environment (e.g., such as an environment associated with a route being traversed by the vehicle or other suitable environment). In such instances, because the video data is captured by the one or more image capturing devices in the real world environment, the video data may capture lighting conditions generated by various light sources at a time and location corresponding to the captured video data. Additionally, the video data may include various artifacts of the lighting conditions, such as vehicle shadows on the ground, glare or reflected light on the exterior portion of the vehicle, and/or the like.

Typically, the video data is combined with virtual elements, such as a 3D model of the vehicle. To make the 3D model look more photorealistic, virtual light sources may be provided (e.g., rendered or layered onto the video data) to create reflections off of the vehicle exterior. Additionally, or alternatively, to make the mixed reality video renderings appear more realistic, virtual shadows may be rendered or layered onto the video data to hide places in the 3D model and/or the mixed reality video renderings that the image capturing devices are unable to capturing (e.g., under the vehicle and/or other occluded or hidden portions of the video data).

However, adding ambient virtual light sources in the 3D model and/or the mixed reality video renderings may also create a mismatch between the virtual lighting and the lighting that was recorded in the real world videos. For example, if the sun is behind the vehicle when the video is recorded, there may be a shadow in front of the vehicle recorded by the image capturing devices, which may be in a location different from a virtual light source that is positioned in front of the vehicle, causing a shadow to be visible behind the vehicle.

Accordingly, systems and methods, such as the systems and methods described herein, configured to align virtual light sources of the mixed reality video renderings with light sources captured in the video data, may be desirable. In some embodiments, the systems and methods described herein may be configured to maintain the illusion that the virtual object (e.g., the vehicle or other suitable object) of the mixed reality video rendering is moving (e.g., driving or other suitable movement) within the video data, by aligning (e.g., making consistent) any virtual lighting and virtual shadows with the lighting directions captured in the video data. The systems and methods described herein may be configured to dynamically detect and/or predict where the lighting sources of the video data were at the time the video data was captured. The systems and methods described herein may be configured to provide, in the mixed reality video rendering, virtual lighting sources that are equivalent to the detected lighting sources of the video data, which may maintain consistency between the lighted elements of the video data and the lighted elements of the mixed reality video rendering.

In some embodiments, the systems and methods described herein may be configured to estimate a position of a light source (e.g., the sun, one or more street lights, overhead lights, and/or any other suitable light source) relative to the vehicle using the one or more sunload sensors of the vehicle. The one or more sunload sensors may be disposed on a dashboard of the vehicle, on a windshield of the vehicle, or other suitable location on the vehicle. The one or more sunload sensors may provide one or more measurements of an azimuth of the sun, an elevation of the sun, an intensity of the sun, and/or any other suitable measurement.

In some embodiments, the systems and methods described herein may be configured to predict light source angle based on global positioning system coordinates of the vehicle, a time of day, data available on a network (e.g., such as the Internet) that provides the azimuth and/or elevation of the sun, and/or other suitable information or data. For example, the systems and methods described herein may be configured to use a publicly available web service to determine current weather conditions for global positioning system coordinates corresponding to the location of the vehicle (e.g., and/or any other suitable location information, such as a name of a current city of the vehicle, a name of a current state of the vehicle, a name of a current region of the vehicle, an address proximate the vehicle, cross roads proximate the vehicle, and/or other location information of the vehicle), at a time corresponding to a capturing time of the video data to determine whether the weather conditions include a sunny condition, a cloudy condition, and the like. The systems and methods described herein may be configured to determine a light intensity of the light source of the video data based on the weather conditions.

In some embodiments, the systems and methods described herein may be configured to use an open computer vision (OpenCV) image analysis technique and/or a machine learning model, to analyze video captured from one or more image capturing devices of the vehicle (e.g., configured to provide a 360-degree video of the environment of the vehicle) to identify relatively bright light sources, such as the sun (e.g., which may provide an advantage of finding additional light sources, such as the a full moon or relatively bright street lights near the vehicle, which may cast a shadow in the video data).

In some embodiments, the systems and methods described herein may be configured to use the OpenCV technique and/or the machine learning model to identify a real vehicle shadow being cast on the ground, as captured in the video data. The systems and methods described herein may be configured to use the identified real shadow to estimate the position of the sun (e.g., and/or other light sources) that created the shadow.

In some embodiments, the systems and methods described herein may be configured to use the estimated position of the sun (e.g., and/or other light sources) to generate a virtual light source in the mixed reality video rendering to illuminate the virtual 3D objects, which may create realistic reflections and shadows that are compatible in direction, size, and intensity with the identified real shadows captured in the video data. The systems and methods described herein may be configured to position the virtual light source in the mixed reality video rendering an azimuth and/or elevation corresponding to the azimuth and/or angle relative to the vehicle.

The systems and methods described herein may be configured to combine data provided on the sun azimuth and angle based on the compass direction, with the vehicle travel direction (e.g., determined using a global position system coordinates and/or compass reading). The systems and methods described herein may be configured to convert the predicted sun position to a relative angle and elevation. The systems and methods described herein may be configured to position the virtual light source in the mixed reality video rendering to match a position of the light source captured in the video data.

The systems and methods described herein may be configured to generate the mixed reality video rendering on a virtual turntable based on the sun azimuth and angle determined using the compass direction. The systems and methods described herein may be configured to use sun angle and elevation could directly to position the virtual light source in the mixed reality video rendering and rotate the virtual turntable, such that the virtual rendering of vehicle (e.g., the 3D model of the vehicle or other suitable object in the mixed reality video rendering) and video bowl view shader objects are aligned with a transmitted (e.g., or saved) heading of the vehicle, measured from the global position system and/or or magnetic or electronic compass.

The systems and methods described herein may be configured to, after positioning the virtual light source in the mixed reality video rendering, use the intensity estimate of the real world light sources to control the intensity of the virtual light source. For example, more intense light sources may create virtual shadows with more contrast and less transparency, while weaker light sources may create virtual shadows that appear with less contrast and more transparency.

In some embodiments, the systems and methods described herein may be configured to generate a virtual rendering of one or more non-virtual objects and/or one or more virtual objects. The systems and methods described herein may be configured to receive first image data that includes a plurality of images. Each image of the plurality of images may correspond to an environment of a non-virtual object. The first image data may be captured using at least one image capturing device. The first image data may be captured in real-time and/or pre-recorded. The at least one image capturing device may be disposed on an exterior portion of the non-virtual object, on an interior portion of the non-virtual object, and/or any other suitable location. The non-virtual object includes a vehicle and/or any other suitable non-virtual object, such as a pedestrian, an animal, a building, a structure, and/or the like.

The systems and methods described herein may be configured to determine a current position of a light source relative to the non-virtual object. The light source may include the sun, one or more street lights, one or more overhead lights, and/or any other suitable light source. The systems and methods described herein may be configured to determine the current position of the light source relative to the non-virtual object based on global position system coordinates corresponding to the non-virtual object, a time of day (e.g., corresponding to a time of the capturing of the first image data), sunload data received from a sunload sensor of the non-virtual object, second image data received from one or more image capturing devices associated with the non-virtual object, any other suitable data or information, or any suitable combination thereof.

The systems and methods described herein may be configured to determine a current intensity value of the light source. The systems and methods described herein may be configured to determine the current intensity value of the light source based on global position system coordinates corresponding to the non-virtual object, a time of day (e.g., corresponding to a time of the capturing of the first image data), sunload data received from the sunload sensor of the non-virtual object, any other suitable data or information, or any suitable combination thereof.

In some embodiments, the systems and methods described herein may be configured to provide the first image data to an artificial intelligence engine that uses at least one machine learning model to provide at least one prediction. The at least one prediction may indicate a predicted current position of the light source relative to the non-virtual object, the current intensity of the light source, and/or any other suitable information. The systems and methods described herein may be configured to determine the current position of the light source relative to the non-virtual object, the current intensity of the light source, and/or any other suitable information based on the at least one prediction.

The systems and methods described herein may be configured to generate a virtual rendering of the non-virtual object using the plurality of images. The systems and methods described herein may be configured to position a virtual light source in the virtual rendering based on the current position of the light source relative to the non-virtual object, and the current intensity value of the light source. The systems and methods described herein may be configured to selectively adjust at least one aspect of the virtual rendering based on a change in at least one of the current position of the light source relative to the non-virtual object, the current intensity value of the light source, the time of day, and/or any other suitable change. The change in the at least one of the current position of the light source relative to the non-virtual object and the current intensity value of the light source may correspond to at least one of a change in position of the non-virtual object, a change in an exposure of light from the light source on the non-virtual object, and/or any other suitable change. For example, the sun may become occluded by clouds, the time of day may change such that the sun is in a different position relative to the non-virtual object, the non-virtual object may travel into a covered area (e.g., such as a tunnel or other suitable covered area), the non-virtual object may travel near a relatively large structure (e.g., such as a relatively tall building) that occludes at least a portion of the sun, and/or the like. Additionally, or alternatively, the systems and methods described herein may be configured to adjust at last one aspect of the virtual rendering at a suitable frequency based on the change in the time of day and/or periodically or according to any suitable frequency to account for any suitable change in the position, intensity, any/or other suitable data associated with the at least one light source of the first image data, the second image data, and/or any other suitable image data.

The systems and methods described herein may be configured to provide, at a display, the virtual rendering. The display may include any suitable display, including, but not limited to, a mobile phone display, a computing display, a display of a vehicle (e.g., including, but not limited to, an infotainment display), and/or any other suitable display.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels 22 and for use on roads, the principles of the present disclosure may apply to other vehicles, such as planes, boats, trains, drones, or other suitable vehicles. The vehicle 10 may include any level of automation, such that the vehicle 10 may comprise no automation or may comprise a semi-autonomous vehicle or autonomous vehicle. It should be understood that, while a vehicle is provided as an example application of the systems and methods described herein, the systems and methods described herein may be applied to any suitable application, including, but not limited to, virtual assistants, home automation systems, and the like.

The vehicle 10 includes a vehicle body 12, a hood 14, and a passenger compartment 18 at least partially defined by the vehicle body 12. The hood 14 may be moveably attached to a portion of the vehicle body 12, such that the hood 14 provides access to an engine compartment 20. In some embodiments, the engine compartment 20 may be disposed in a rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system (e.g., house at least partially within the engine compartment 20) including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. Additionally, or alternatively, propulsion controls, such as an accelerator actuator (e.g., an accelerator pedal), a brake actuator (e.g., a brake pedal), a steering wheel, and other such components are disposed in the passenger compartment 18. The propulsion controls may be actuated or controlled by a driver of the vehicle 10 and may be directly connected to corresponding components of the propulsion system, such as a throttle, a brake, a vehicle axle, a vehicle transmission, and the like, respectively.

In some embodiments, the vehicle 10 includes a transmission that may include a manual transmission, an automatic transmission, and the like. The vehicle 10 may include one or more pistons, in the case of an internal combustion engine or a hybrid vehicle, which cooperatively operate with a crankshaft to generate force, which is translated through the transmission to one or more axles, which turns wheels 22. When the vehicle 10 includes one or more electric motors, one or more vehicle batteries and/or one or more fuel cells provide energy to the electric motors to turn the wheels 22.

In some embodiments, the vehicle 10 may include a suitable communication network, such as a controller area network (CAN) comprising a CAN bus or other suitable networks or communication systems, or a combination thereof to communicate various information from, for example, sensors within or external to the vehicle, to, for example, various processors or controllers within or external to the vehicle. In some embodiments, the vehicle 10 may include other various communications systems or devices, including, but not limited to, a telematics system or device, a wireless communications system or device (e.g. including a WiFi radio or other suitable wireless radio or device), a cellular data system or device, and/or any other suitable communications device. In some embodiments, the vehicle 10 may be configured to communicate with various remote networks (e.g., via the communications systems or devices), such as the Internet or other suitable networks remotely located from the vehicle 10. The vehicle 10 may include additional or fewer features than those generally illustrated and/or disclosed herein.

Figure 2:
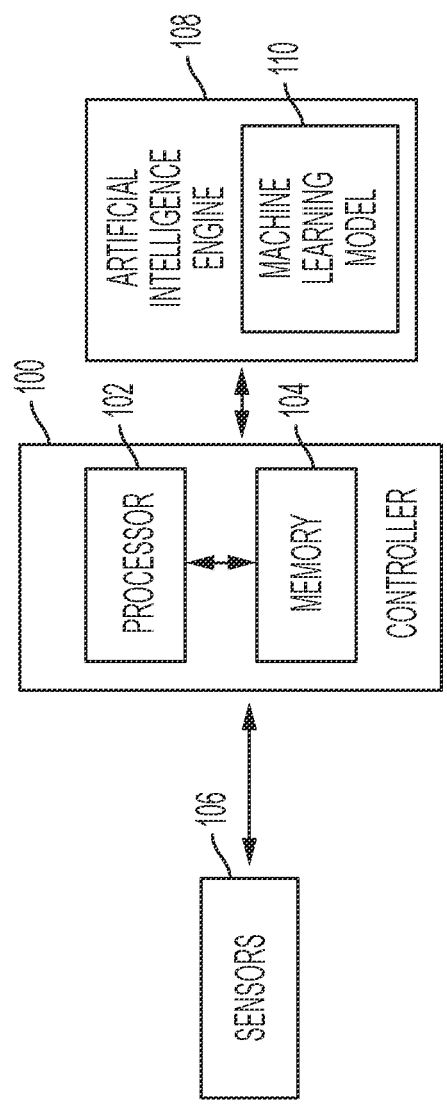
FIG. 2 generally illustrates a vehicle controller according to the principles of the present disclosure.

In some embodiments, the steering system may include a controller, such as controller 100, as is generally illustrated in FIG. 2. The controller 100 may include any suitable controller. The controller 100 may be configured to control, for example, the various functions of the vehicle systems described herein. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various functions of the vehicle 10 and/or any other suitable function, including those of the systems and methods described herein.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more motor position sensors or devices, one or more image capturing sensors or devices, one or more audio capturing sensors or devices, other suitable sensors or devices, one or more sunload sensors or devices, or a combination thereof. In some embodiments, the sensors 106 may include one or more 360 degree image capturing sensors. The one or more 360 degree image capturing sensors may be disposed at various locations on the vehicle 10, including, but not limited to, a front grill of the vehicle 10, on a rear portion of the vehicle 10 (e.g., on a rear trunk and/or on any other suitable rear portion of the vehicle 10), on one or more side view mirrors of the vehicle 10, and/or on any other suitable location of the vehicle 10. Additionally, or alternatively, one or more sunload sensors or devices 106 may be disposed on a front window or windscreen of the vehicle 10, on a dashboard of the vehicle 10, and/or on any other suitable location of the vehicle 10. The one or more signals may indicate a vehicle speed, image data corresponding to an environment of the vehicle 10, audio data associated with the environment or other aspects of the vehicle 10, other suitable information, or a combination thereof.

In some embodiments, the controller 100 may use an artificial intelligence engine 108 configured to use at least one machine learning model 110 to perform the embodiments of systems and methods described herein. The artificial intelligence engine 108 may include any suitable artificial intelligence engine and may be disposed within the vehicle 10 or remotely located from the vehicle 10, such as in a cloud computing device or other suitable remotely located computing device. The artificial intelligence engine 108 may use one or more machine learning models 110 to perform at least one of the embodiments disclosed herein.

The controller 100 may include a training engine capable of generating the one or more machine learning models 110. The machine learning models 110 may include any suitable model, including, but not limited to, a convolutional neural network. The machine learning model 110 may be trained using data comprising images of various environments of various vehicles or other suitable objects. Various similarity techniques may be used to remove duplicate data. Additionally, or alternatively, the images may be fine-tuned to remove any undesirable samples. The machine learning model 110, having been trained using the training data, may be configured to identify light sources, light intensity, and/or any other suitable feature of a plurality of images provided as input to the machine learning model 110. The machine learning model 110 may output a prediction indicating a predicted location or position of a light source relative to the vehicle 10 or other suitable object, and/or a light intensity associated with the light source relative to the vehicle 10 or other suitable object.

Figure 3:
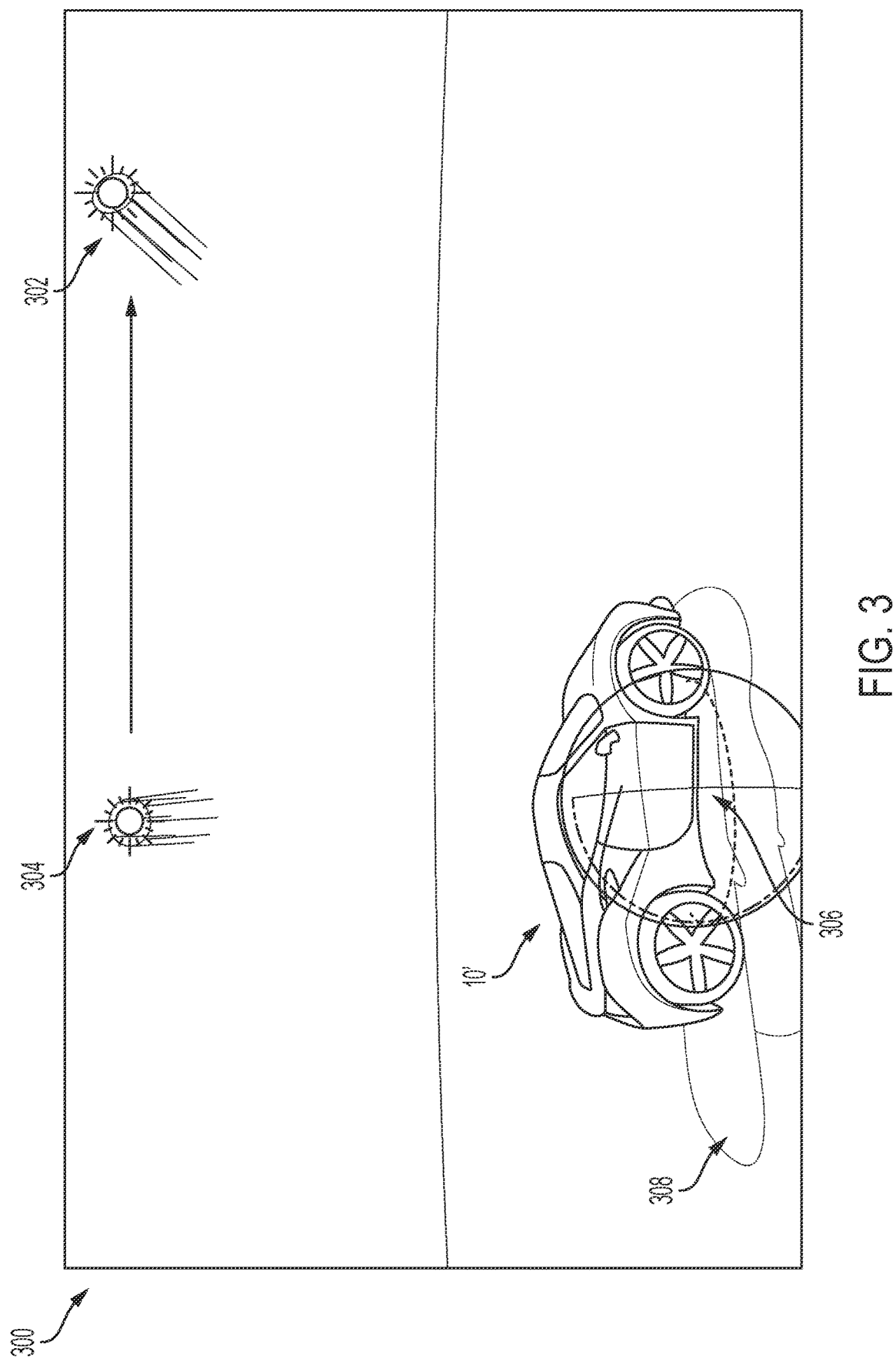
FIG. 3 generally illustrates rendering of a virtual object positioned in a location of a corresponding non-virtual object in an environment of the non-virtual object, according to the principles of the present disclosure.

In some embodiments, the controller 100 may be to generate, as is generally illustrated in FIG. 3, a virtual rendering 300 (e.g., which may be referred to herein as a mixed reality video rendering) including a virtual vehicle 10', of a non-virtual object, such as the vehicle 10. In some embodiments, the virtual rendering 300 may include virtual objects, such as shadows, animations, and/or other virtual objects, that may or may not correspond to a non-virtual object. The virtual vehicle 10' may be combined with received first image data, which includes a plurality of images, to generate the mixed reality video rendering 300. Each image of the plurality of images may correspond to an environment of the vehicle 10. The first image data may be captured using at least one image capturing device, such as one or more of the sensors 106. The first image data may be captured in real-time and/or pre-recorded.

The controller 100 may determine a current position of a light source 302 relative to the vehicle 10, based on global position system coordinates corresponding to the vehicle 10, a time of day (e.g., corresponding to a time of the capturing of the first image data and corresponding to the global position system coordinates or any other suitable location information, such as the location information described herein), sunload data received from a sunload sensor 106 of the vehicle 10, second image data received from one or more image capturing device 106, any other suitable data or information, or any suitable combination thereof.

The controller 100 may determine a current intensity value of the light source 302 based on global position system coordinates corresponding to the vehicle 10, a time of day (e.g., corresponding to a time of the capturing of the first image data and corresponding to the global position system coordinates or any other suitable location information, such as the location information described herein), sunload data received from the sunload sensor 106, any other suitable data or information, or any suitable combination thereof.

In some embodiments, the controller 100 may use the artificial intelligence engine 108 to predict the current position of the light source 302, the current intensity value of the light source 302, and/or any other suitable information. For example, the controller 100 may provide the first image data to the artificial intelligence engine 108 that uses the at least one machine learning model 110 to provide at least one prediction. The at least one prediction may indicate a predicted current position of the light source 302 relative to the vehicle 10, the current intensity value of the light source 302, and/or any other suitable information. The controller 100 may determine the current position of the light source 302 relative to the vehicle 10, the current intensity of the light source 302, and/or any other suitable information based on the at least one prediction.

The controller 100 may generate the virtual rendering 300 using the plurality of images. For example, the controller 100 may use the plurality of images to generate or display the environment of the vehicle 10. The controller 100 may generate the virtual vehicle 10' and position the virtual vehicle 10' in a location of the virtual rendering 300 corresponding to a position and/or location of the vehicle 10 captured in the first image data. In this manner, an operator of the vehicle 10 may, when the virtual rendering 300 is displayed, observe the virtual vehicle 10' as traversing the route of the vehicle 10, moving in the same direction as the vehicle 10, and so on.

In some embodiments, the controller 100 may generate a virtual light source 304 and position the virtual light source 304 in the virtual rendering 300. As is illustrated in FIG. 3, when the virtual light source 304 is positioned in the virtual rendering 300 at a location different from the light source 302, the virtual light source 304 may generate a virtual shadow 306 that varies in position and/or intensity from a real shadow 308 generated by the light source 302. The controller 100 may position the virtual light source 304 in the virtual rendering 300 based on the current position of the light source 302 relative to the vehicle 10, such that the virtual light source 304 aligns or coordinates with the current position of the light source 302. The controller 100 may adjust the intensity value of the virtual light source 304 based on the current intensity value of the light source 302, such that the intensity value of the virtual light source 304 aligns or coordinates with the current intensity value of the light source 302. In this manner, the controller 100 may provide a virtual shadow 306 that has a position and intensity value that aligns or coordinates with the current position and/or the current intensity value of the real shadow 308 and/or light reflection, glare, and the like on the virtual vehicle 10' (e.g., and/or any other suitable virtual objects of the virtual rendering) that coordinates with the reflection, glare, and the like of the vehicle 10 due to the light source 302.

In some embodiments, the controller 100 may selectively adjust at least one aspect of the virtual rendering 300 (e.g., such as the position and/or intensity value of the virtual light source 304) based on a change in at least one of the current position of the light source 302 relative to the vehicle 10, the current intensity value of the light source 302, the time of day, and/or any other suitable change. For example, the controller 100 may receive second image data from the one or more image capturing devices 106. The second data may be captured after the first image data. The controller 100 may determine, as described herein, the current position of the light source 302 relative to the vehicle 10, the current intensity of the light source 302, and/or any other suitable information, using the second image data.

In some embodiments, the controller 100 may use the artificial intelligence engine 108 to predict the current position of the light source 302, the current intensity value of the light source 302, and/or any other suitable information, using the second image data. For example, the controller 100 may provide the second image data to the artificial intelligence engine 108 that uses the at least one machine learning model 110 to provide at least one prediction. The at least one prediction may indicate a predicted current position of the light source 302 relative to the vehicle 10, the current intensity value of the light source 302, and/or any other suitable information. The controller 100 may determine whether the current position of the light source 302 relative to the vehicle 10 and/or the current intensity of the light source 302 changed (e.g., between the first image data and the second image data) based on the current position of the light source 302 relative to the vehicle 10 and/or the current intensity of the light source 302 determined based on the first image data (e.g., determined using the at least one prediction provided by the at least one machine learning model 110 using the first image data or determined using any suitable technique described herein) and the at least one prediction provided by the at least one machine learning model 110 using the second image data.

Additionally, or alternatively, the controller 100 may adjust at last one aspect of the virtual rendering 300 at a suitable frequency based on the change in the time of day and/or periodically or according to any suitable frequency to account for any suitable change in the position, intensity, any/or other suitable data associated with the at least one light source 302 of the first image data, the second image data, and/or any other suitable image data.

The systems and methods described herein may be configured to provide, at a display, the virtual rendering 300, including at least the virtual vehicle 10', the virtual shadow 306 (e.g., positioned and adjusted such that the position and intensity value of the virtual shadow 306 aligns or coordinates with the position and intensity value of the real shadow 308), the virtual light source 304, an/or any other suitable data, object, information, rendering, and/or the like.

In some embodiments, the controller 100 may perform the methods described herein. However, the methods described herein as performed by the controller 100 are not meant to be limiting, and any type of software executed on a controller or processor can perform the methods described herein without departing from the scope of this disclosure. For example, a controller, such as a processor executing software within a computing device, can perform the methods described herein.

Figure 4:
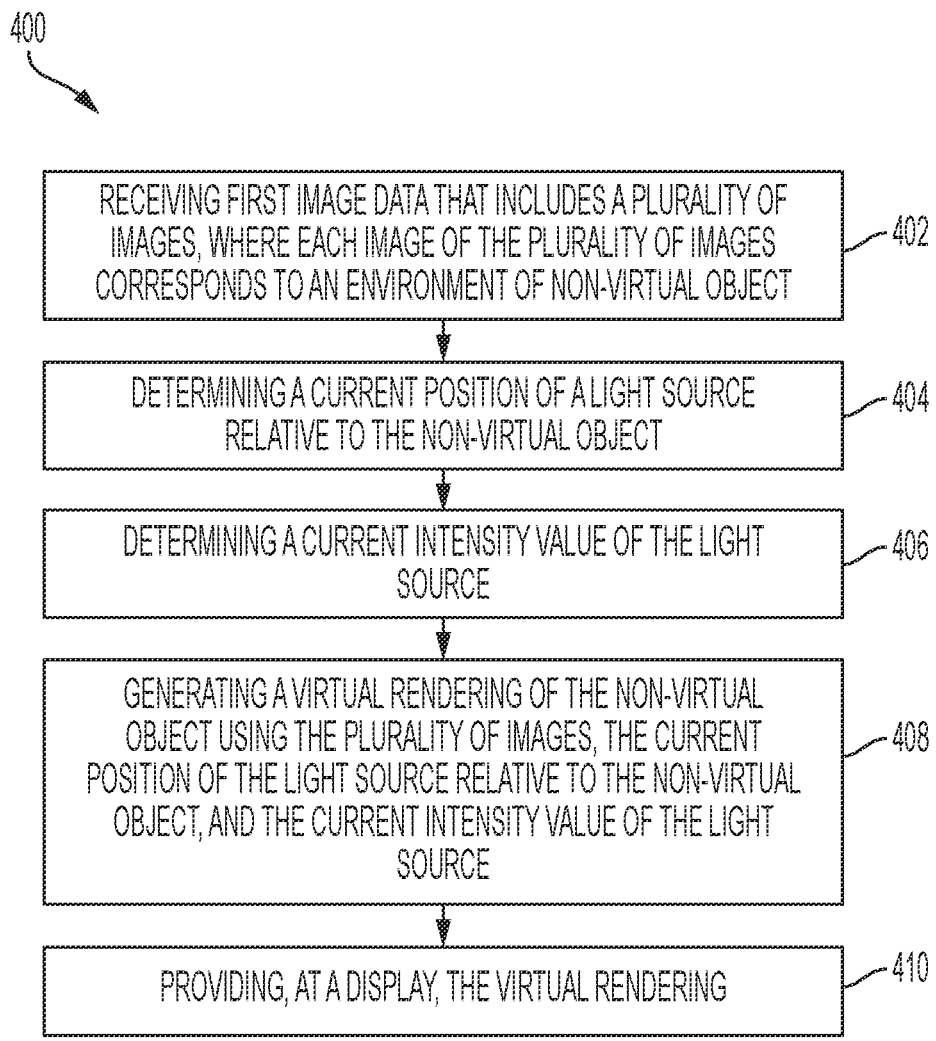
FIG. 4 generally illustrates a flow diagram of a method for generating a virtual rendering of at least a non-virtual object according to the principles of the present disclosure.

FIG. 4 is a flow diagram generally illustrating a method 400 for generating a virtual rendering of at least a non-virtual object according to the principles of the present disclosure. At 402, the method 400 receives first image data that includes a plurality of images. Each image of the plurality of images may correspond to an environment of a non-virtual object. For example, the controller 100 may receive the first image data that includes the plurality of images. The plurality of images may correspond to the environment of the vehicle 10.

At 404, the method 400 determines a current position of a light source relative to the non-virtual object. For example, the controller 100 may determine the current position of the light source 302 relative to the vehicle 10.

At 406, the method 400 determines a current intensity value of the light source. For example, the controller 100 may determine the current intensity value of the light source 302.

At 408, the method 400 generates a virtual rendering of the non-virtual object using the plurality of images, the current position of the light source relative to the non-virtual object, and the current intensity value of the light source. For example, the controller 100 may generate the virtual rendering 300 of the vehicle 10 using the plurality of images, the current position of the light source 302 relative to the vehicle 10, and the current intensity value of the light source 302.

At 410, the method 400 provides, at a display, the virtual rendering. For example, the controller 100 may provide, at the display, the virtual rendering 300.

Clause 1. A method for generating a virtual rendering, the method comprising: receiving first image data that includes a plurality of images, each image of the plurality of images corresponding to an environment of a non-virtual object; determining a current position of a light source relative to the non-virtual object; determining a current intensity value of the light source; generating a virtual rendering of the non-virtual object using the plurality of images, the current position of the light source relative to the non-virtual object, and the current intensity value of the light source; and providing, at a display, the virtual rendering.

Clause 2. The method of any of the clauses herein, wherein the first image data is captured using at least one image capturing device.

Clause 3. The method of any of the clauses herein, wherein the at least one image capturing device is disposed on at least one of an exterior portion of the non-virtual object and an interior portion of the non-virtual object.

Clause 4. The method of any of the clauses herein, wherein the non-virtual object includes a vehicle.

Clause 5. The method of any of the clauses herein, wherein the first image data is at least one of captured in real-time and captured at a time prior to a time corresponding to the current position of the light source relative to the non-virtual object.

Clause 6. The method of any of the clauses herein, wherein determining the current position of the light source relative to the non-virtual object is based on global position system coordinates corresponding to the non-virtual object.

Clause 7. The method of any of the clauses herein, wherein determining the current position of the light source relative to the non-virtual object is based on a time of day.

Clause 8. The method of any of the clauses herein, wherein determining the current position of the light source relative to the non-virtual object is based on sunload data received from a sunload sensor of the non-virtual object.

Clause 9. The method of any of the clauses herein, wherein determining the current position of the light source relative to the non-virtual object is based on second image data received from one or more image capturing devices associated with the non-virtual object.

Clause 10. The method of any of the clauses herein, further comprising providing the second image data to an artificial intelligence engine that uses at least one machine learning model to provide at least one prediction, wherein the at least one prediction indicates a predicted current position of the light source relative to the non-virtual object, and wherein determining the current position of the light source relative to the non-virtual object is based on the at least one prediction.

Clause 11. The method of any of the clauses herein, wherein light from the light source includes sun light.

Clause 12. The method of any of the clauses herein, wherein the light source includes a street light.

Clause 13. The method of any of the clauses herein, wherein determining the current intensity value of the light source is based on global position system coordinates corresponding to the non-virtual object.

Clause 14. The method of any of the clauses herein, wherein determining the current intensity value of the light source is based on a time of day.

Clause 15. The method of any of the clauses herein, wherein determining the current intensity value of the light source is based on sunload data received from a sunload sensor of the non-virtual object.

Clause 16. The method of any of the clauses herein, further comprising selectively adjusting at least one aspect of the virtual rendering based on a change in at least one of the current position of the light source relative to the non-virtual object and the current intensity value of the light source.

Clause 17. The method of any of the clauses herein, wherein the change in the at least one of the current position of the light source relative to the non-virtual object and the current intensity value of the light source corresponds to at least one of a change in position of the non-virtual object and a change in an exposure of light from the light source on the non-virtual object.

Clause 18. The method of any of the clauses herein, further comprising selectively adjusting at least one aspect of the virtual rendering periodically based on change in a time of day.

Clause 19. A system for generating a virtual rendering, the system comprising: a processor; and a memory including instructions that, when executed by the processor, cause the processor to: receive first image data that includes a plurality of images, each image of the plurality of images corresponding to an environment of a non-virtual object; determine a current position of a light source relative to the non-virtual object; determine a current intensity value of the light source; generate a virtual rendering of the non-virtual object using the plurality of images, the current position of the light source relative to the non-virtual object, and the current intensity value of the light source; and provide, at a display, the virtual rendering.

Clause 20. An apparatus generating a virtual rendering of a vehicle, the apparatus comprising: a vehicle controller configured to: receive first image data that includes a plurality of images, each image of the plurality of images corresponding to an environment of a vehicle; determine a current position of at least one light source relative to the vehicle; determine a current intensity value of the at least one light source; generate a virtual rendering of the vehicle using the plurality of images; position a virtual light source in the virtual rendering based on the current position of the at least one light source relative to the vehicle; adjust an intensity value of the virtual light source based on the current intensity value of the at least one light source; and provide, at a display of the vehicle, the virtual rendering.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations of the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for generating a virtual rendering, the method comprising:
   receiving first image data that includes a plurality of images, each image of the plurality of images corresponding to an environment of a non-virtual object and including one or more other non-virtual objects;
   determining a current position of a light source relative to the non-virtual object;
   determining a current intensity value of the light source;
   generating a virtual rendering of the non-virtual object using the plurality of images;
   generating an adjusted virtual rendering of the non-virtual object by adjusting at least one shadow of the virtual rendering of the non-virtual object based on the current position of the light source relative to the non-virtual object, and the current intensity value of the light source;
   generating video data using second image data and the adjusted virtual rendering of the non-virtual object, wherein the video data includes the one or more other non-virtual objects and the adjusted virtual rendering of the non-virtual object; and
   providing, at a display, the video data.

2. The method of claim 1, wherein the first image data is captured using at least one image capturing device.

3. The method of claim 2, wherein the at least one image capturing device is disposed on at least one of an exterior portion of the non-virtual object and an interior portion of the non-virtual object.

4. The method of claim 3, wherein the non-virtual object includes a vehicle.

5. The method of claim 1, wherein the first image data is at least one of captured in real-time and captured at a time prior to a time corresponding to the current position of the light source relative to the non-virtual object.

6. The method of claim 1, wherein determining the current position of the light source relative to the non-virtual object is based on global position system coordinates corresponding to the non-virtual object.

7. The method of claim 1, wherein determining the current position of the light source relative to the non-virtual object is based on a time of day.

8. The method of claim 1, wherein determining the current position of the light source relative to the non-virtual object is based on sunload data received from a sunload sensor of the non-virtual object.

9. The method of claim 1, wherein determining the current position of the light source relative to the non-virtual object is based on second image data received from one or more image capturing devices associated with the non-virtual object.

10. The method of claim 9, further comprising providing the second image data to an artificial intelligence engine that uses at least one machine learning model to provide at least one prediction, wherein the at least one prediction indicates a predicted current position of the light source relative to the non-virtual object, and wherein determining the current position of the light source relative to the non-virtual object is based on the at least one prediction.

11. The method of claim 1, wherein light from the light source includes sun light.

12. The method of claim 1, wherein the light source includes a street light.

13. The method of claim 1, wherein determining the current intensity value of the light source is based on global position system coordinates corresponding to the non-virtual object.

14. The method of claim 1, wherein determining the current intensity value of the light source is based on a time of day.

15. The method of claim 1, wherein determining the current intensity value of the light source is based on sunload data received from a sunload sensor of the non-virtual object.

16. The method of claim 1, further comprising selectively adjusting at least one aspect of the virtual rendering based on a change in at least one of the current position of the light source relative to the non-virtual object and the current intensity value of the light source.

17. The method of claim 16, wherein the change in the at least one of the current position of the light source relative to the non-virtual object and the current intensity value of the light source corresponds to at least one of a change in position of the non-virtual object and a change in an exposure of light from the light source on the non-virtual object.

18. The method of claim 1, further comprising selectively adjusting at least one aspect of the virtual rendering periodically based on change in a time of day.

19. A system for generating a virtual rendering, the system comprising:
   a processor; and
   a memory including instructions that, when executed by the processor, cause the processor to:
   receive first image data that includes a plurality of images, each image of the plurality of images corresponding to an environment of a non-virtual object and including one or more other non-virtual objects;
   determine a current position of a light source relative to the non-virtual object;
   determine a current intensity value of the light source;
   generate a virtual rendering of the non-virtual object using the plurality of images;
   generate an adjusted virtual rendering of the non-virtual object by adjusting at least one shadow of the virtual rendering of the non-virtual object based on the current position of the light source relative to the non-virtual object, and the current intensity value of the light source;
   generate video data using second image data and the adjusted virtual rendering of the non-virtual object, wherein the video data includes the one or more other non-virtual objects and the adjusted virtual rendering of the non-virtual object; and
   provide, at a display, the video data.

20. An apparatus generating a virtual rendering of a vehicle, the apparatus comprising:
   a vehicle controller configured to:
   receive first image data that includes a plurality of images, each image of the plurality of images corresponding to an environment of a vehicle and including one or more non-virtual objects;

determine a current position of at least one light source relative to the vehicle;

determine a current intensity value of the at least one light source;

generate a virtual rendering of the vehicle using the plurality of images;

position a virtual light source in the virtual rendering based on the current position of the at least one light source relative to the vehicle;

adjust an intensity value of the virtual light source based on the current intensity value of the at least one light source;

generate an adjusted virtual rendering of the vehicle by adjusting at least one shadow of the virtual rendering of the vehicle based on the position of the virtual light source and the intensity value;

generate video data using second image data and the adjusted virtual rendering of the vehicle, wherein the video data includes the one or more non-virtual objects and the adjusted virtual rendering of the vehicle; and provide, at a display of the vehicle, the video data.

* * * * *